(12) United States Patent
Ohno

(10) Patent No.: US 10,572,233 B2
(45) Date of Patent: Feb. 25, 2020

(54) VECTORIZATION DEVICE, VECTORIZATION METHOD, AND RECORDING MEDIUM ON WHICH VECTORIZATION PROGRAM IS STORED

(71) Applicant: NEC Corporation, Minato-ku, Tokyo (JP)

(72) Inventor: Yoshiyuki Ohno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 15 days.

(21) Appl. No.: 15/770,524

(22) PCT Filed: Nov. 17, 2016

(86) PCT No.: PCT/JP2016/084115
§ 371 (c)(1),
(2) Date: Apr. 24, 2018

(87) PCT Pub. No.: WO2017/086391
PCT Pub. Date: May 26, 2017

(65) Prior Publication Data
US 2019/0056920 A1  Feb. 21, 2019

(30) Foreign Application Priority Data
Nov. 20, 2015  (JP) ................................. 2015-227256

(51) Int. Cl.
*G06F 9/44* (2018.01)
*G06F 8/41* (2018.01)
(Continued)

(52) U.S. Cl.
CPC ................ *G06F 8/443* (2013.01); *G06F 7/00* (2013.01); *G06F 9/3001* (2013.01); *G06F 9/30065* (2013.01)

(58) Field of Classification Search
CPC ....................................................... G06F 8/443
See application file for complete search history.

(56) References Cited

U.S. PATENT DOCUMENTS 5,710,913 A * 1/1998 Gupta ....................... G06F 1/32
712/227
2004/0261067 A1* 12/2004 Komatsu ................. G06F 8/443
717/158
(Continued)

FOREIGN PATENT DOCUMENTS

| JP | H4-97484 A | 3/1992 |
|----|-----------|--------|
| JP | 2001-43209 A | 2/2001 |
| JP | 3657414 B2 | 6/2005 |

OTHER PUBLICATIONS

Uehara et al., "An Automatic Vectorizing/Parallelizing Pascal Compiler V-Pascal Ver. 3", Technical Report of Institute of Electronics, Information and Communications Engineers, Dec. 9, 1994, vol. 94, No. 384, (CPSY94-90) (12 pages total).

(Continued)

*Primary Examiner* — Hang Pan

(57) ABSTRACT

Provided is a vectorization device 30 comprising: a unit 31 that detects a configuration in which the inner loop length depends on the outer loop variable, and in which a first array indicating the results of dual-loop processing does not contain the inner loop variable as an index value; an unit 32 that, when the configuration is detected, determines a fixed value as the inner loop length; an unit 33 that expands the array size of a second array used in the calculation of the first array value, and thereby enables dual-loop processing of the inner loop; an unit 34 that sets an element value for an added element of the second array, and thereby, before and after such processing is carried out, enables the results of the dual-loop processing to be made equal; and an unit 35 that updates the software on the basis of such processing results.

10 Claims, 17 Drawing Sheets

(51) Int. Cl.
 *G06F 7/00* (2006.01)
 *G06F 9/30* (2018.01)

(56) References Cited

U.S. PATENT DOCUMENTS

| | | | | |
|---|---|---|---|---|
| 2010/0318979 | A1* | 12/2010 | Greyzck | G06F 8/443 |
| | | | | 717/160 |
| 2014/0096119 | A1* | 4/2014 | Vasudevan | G06F 8/452 |
| | | | | 717/160 |
| 2015/0007154 | A1* | 1/2015 | Bharadwaj | G06F 9/06 |
| | | | | 717/160 |
| 2016/0085530 | A1* | 3/2016 | Duran Gonzalez | G06F 8/452 |
| | | | | 717/105 |
| 2016/0139901 | A1* | 5/2016 | Margiolas | G06F 8/456 |
| | | | | 717/150 |

OTHER PUBLICATIONS

International Search Report dated Jan. 10, 2017 issued by the International Searching Authority in No. PCT/JP2016/084115.

* cited by examiner

Fig. 2

201 SOURCE PROGRAM

```
#pragma array_size(X,NI,NJ[])
#pragma array_size(Y,NI,NJ[])
#pragma array_size(Z,NI,NJ[])
for(i=0; i<NI; i++) {
  for(j=0; j<NJ[i]; j++) {
    X[i][j] = Y[i][j] * Z[i][j] ;
  }
}
```

Fig. 3

| ARRAY NJ | ARRAY X | ARRAY Y | ARRAY Z |
|---|---|---|---|
| NJ[0]=2 | X[0] | Y[0] | Z[0] |
| NJ[1]=4 | X[1] | Y[1] | Z[1] |
| NJ[2]=0 | X[2] | Y[2] | Z[2] |
| NJ[3]=3 | X[3] | Y[3] | Z[3] |
| NJ[4]=1 | X[4] | Y[4] | Z[4] |
| NJ[5]=2 | X[5] | Y[5] | Z[5] |
| ... | ... | ... | ... |
| NJ[NI-1]=2 | X[NI-1] | Y[NI-1] | Z[NI-1] |

Fig. 4

| ARRAY NJ | ARRAY X | ARRAY Y | ARRAY Z |
|---|---|---|---|
| NJ[0]=2 | X[0] | Y[0] | Z[0] |
| NJ[1]=4 | X[1] | Y[1] | Z[1] |
| NJ[2]=0 | X[2] | Y[2] | Z[2] |
| NJ[3]=3 | X[3] | Y[3] | Z[3] |
| NJ[4]=1 | X[4] | Y[4] | Z[4] |
| NJ[5]=2 | X[5] | Y[5] | Z[5] |
| ... | ... | ... | ... |
| NJ[NI−1]=2 | X[NI−1] | Y[NI−1] | Z[NI−1] |

Fig. 5

211 VECTORIZED SOURCE PROGRAM

```
for(i=0; i<NI; i++) {
  for(j=0; j<4; j++) {
    X[i][j] = Y[i][j] * Z[i][j] ;
  }
}
```

Fig. 6

212 VECTORIZED SOURCE PROGRAM

```
for(i=0; i<NI; i++) {
  X[i][0] = Y[i][0] * Z[i][0] ;
  X[i][1] = Y[i][1] * Z[i][1] ;
  X[i][2] = Y[i][2] * Z[i][2] ;
  X[i][3] = Y[i][3] * Z[i][3] ;
}
```

Fig. 7

203 SOURCE PROGRAM

```
for(i=0; i<NI; i++) {
  for(j=0; j<NJ[i]; j++) {
    X[i] = X[i] + Y[i][j] * Y[i][j] ;
  }
}
```

Fig. 8

204 SOURCE PROGRAM

```
for(i=0; i<NI; i++) {
  for(j=0; j<NJ[i]; j++) {
    X[i] = X[i] * Y[i][j] ;
  }
}
```

Fig. 9

(a) GENERAL CONFIGURATION OF DUAL LOOP REPRESENTING AGGREGATE ARITHMETIC OPERATION FOR CALCULATING SUM OF ARRAY ARITHMETIC OPERATIONS

```
for i
  for j
    Out[i] = Out[i] + f(In0[i][j], In1[i][j], ...)
```

(b) GENERAL CONFIGURATION OF DUAL LOOP REPRESENTING AGGREGATE ARITHMETIC OPERATION FOR CALCULATING PRODUCT OF ARRAY ARITHMETIC OPERATIONS

```
for i
  for j
    Out[i] = Out[i] * f(In0[i][j], In1[i][j], ...)
```

Fig. 10

```
           213 VECTORIZED SOURCE PROGRAM
for(i=0; i<NI; i++) {
  for(j=0; j<LLEN; j++) {
    X[i] = X[i] + Y[i][j] * Y[i][j] ;
  }
}
```

Fig. 11

```
           214 VECTORIZED SOURCE PROGRAM
for(i=0; i<NI; i++) {
  for(j=0; j<LLEN; j++) {
    X[i] = X[i] * Y[i][j] ;
  }
}
```

Fig. 12

215 VECTORIZED SOURCE PROGRAM

```
for(j=0; j<LLEN; j++) {
  for(i=0; i<NI; i++) {
    X[i] = X[i] + Y[i][j] * Y[i][j] ;
  }
}
```

Fig. 13

216 VECTORIZED SOURCE PROGRAM

```
for(j=0; j<LLEN; j++) {
  for(i=0; i<NI; i++) {
    X[i] = X[i] * Y[i][j] ;
  }
}
```

Fig. 16

```
                    217 VECTORIZED SOURCE PROGRAM
for(j=0; j<LLEN; j++) {
  for(i=0; i<NI; i++) {
    X[i] = X[i] + A[Y[i][j]] ;
  }
}
```

Fig. 17

| ARRAY Y | ARRAY A (NUMBER OF ELEMENTS NA+1) |
|---|---|
| Y[0] | ▪▪▫▫ ... ▪ 0 |
| Y[1] | ▪▪▪▪ |
| Y[2] | ▫▫▫▫ |
| Y[3] | ▪▪▪▫ |
| Y[4] | ▪▫▫▫ |
| Y[5] | ▪▪▫▫ |
| ⋮ | |
| Y[NI-1] | ▪▪▫▫ |

(a) ORIGINAL PROGRAM

```
for (i=0; i<10000; i++) {
    for (j=0; j<10; j++) {
        X[i][j] = Y[i][j] * Z[i][j] ;
    }
}
```

(b) VECTORIZED PROGRAM

```
for (j=0; j<10; j++) {
    for (i=0; i<10000; i++) {
        X[i][j] = Y[i][j] * Z[i][j] ;
    }
}
```

(a) ORIGINAL PROGRAM

```
for(i=0; i<100; i++) {
    for(j=0; j<100; j++) {
        X[i][j] = Y[i][j] * Z[i] ,
    }
}
```

(b) VECTORIZED PROGRAM

```
for(ij=0; ij<100*100; j++) {
    X[ij] = Y[ij] * Z[ij] ;
}
```

Fig. 23         PRIOR ART

```
for(i=0; i<NI; i++) {
  for(j=0; j<NJ[I]; j++) {
    X[i][j] = Y[i][j] * Z[i][j] ;
  }
}
```

Fig. 24

```
for(i=0; i<NI; i++) {
  for(j=0; j<NJ[I]; j++) {
    X[i] += Y[i][j] ;
  }
}
```

VECTORIZATION DEVICE, VECTORIZATION METHOD, AND RECORDING MEDIUM ON WHICH VECTORIZATION PROGRAM IS STORED

This application is a National Stage Entry of PCT/JP2016/084115 filed on Nov. 17, 2016, which claims priority from Japanese Patent Application 2015-227256 filed on Nov. 20, 2015, the contents of all of which are incorporated herein by reference, in their entirety.

TECHNICAL FIELD

The invention of the present application relates to a technique of vectorizing multi-loop processing included in software.

BACKGROUND ART

In order to perform an arithmetic operation at high speed by using a vector arithmetic operation unit or a single instruction multiple data (SIMD) arithmetic operation unit, it is important to vectorize software (a program) in such a way that a vector arithmetic operation instruction is capable of being effectively applied. Vectorization of software refers to performing processing of extracting a common arithmetic operation from loop processing (iteration processing) described by a program targeted for vectorization, or increasing a loop length (the number of iterations) regarding loop processing, and the like.

While software often includes multi-loop processing such as dual-loop processing in general, vectorization regarding multi-loop processing is complex in processing thereof as compared with vectorization regarding single-loop (one-loop) processing. Therefore, expectations for a technique that vectorizes multi-loop processing are growing.

As one example of such a technique, PTL 1 discloses a compile scheme including a parsing unit, a structure analyzing unit, a data dependency relation analyzing unit, a loop switch analyzing unit, a vector text generating unit, and a code generating unit. In order to vectorize dual-loop processing, this compile scheme performs processing of analyzing the dual-loop processing and thus switching an outer loop and an inner loop in a dual loop.

FIG. 21 illustrates an example in which a general vectorization device including the technique described by PTL 1 vectorizes dual-loop processing by switching an inner loop and an outer loop in the dual-loop processing. As illustrated in FIG. 21($a$), an original program to be vectorized by this vectorization device includes dual-loop processing in which a loop length of an outer loop is 10000 and a loop length of an inner loop is 10. In this case, because a vector arithmetic operation unit which executes the program illustrated in FIG. 21($a$) performs vector arithmetic operations by the inner loop having a loop length of 10 10000 times, it cannot be said that efficiency of a vector arithmetic operation is satisfactory. Therefore, this vectorization device generates a program illustrated in FIG. 21($b$) in which the inner loop and the outer loop in the original program are switched. Because a vector arithmetic operation unit which executes the program illustrated in FIG. 21($b$) needs only to perform vector arithmetic operations by the inner loop having a loop length of 10000 10 times, efficiency of a vector arithmetic operation is improved.

Furthermore, PTL 2 discloses a vectorization device including a dimension-mismatching array detection means, a dimension-mismatching array duplication means, an expansion means, and a vectorization implementation means. This vectorization device detects array variables having different numbers of dimensions with respect to a plurality of array variables used by an arithmetic equation included in multi-loop processing in a program. This vectorization device performs processing of converting a multiple loop into a single loop after equalizing sizes of arrays with respect to the detected array variables.

FIG. 22 illustrates an example in which a general vectorization device including the technique described by PTL 2 vectorizes dual-loop processing by converting a dual loop into a single loop. As illustrated in FIG. 22($a$), an original program to be vectorized by this vectorization device uses two-dimensional array variables X and Y having an array size of 100×100 (× represents a multiplication in the present application), and a one-dimensional array variable Z having an array size of 100. This vectorization device expands the array variable Z to a two-dimensional array having an array size of 100×100 after detecting that the array size of the array variable Z is different from those of the array variables X and Y. Then, this vectorization device generates a program illustrated in FIG. 22($b$) in which the array variables X, Y, and Z are converted into a one-dimensional array having a size of 10000 from a two-dimensional array having a size of 100×100.

Furthermore, PTL 3 discloses a vectorization processing scheme of a compiler, capable of vectorizing dual-loop processing even when a loop length of an inner loop in the dual-loop processing is not a fixed value and is dependent on a value of a loop variable of an outer loop.

FIG. 23 illustrates an example of a program vectorized by a general vectorization device including the technique described by PTL 3. NI and NJ in FIG. 23 are a variable representing a loop length of an outer loop, and an array variable representing a loop length of an inner loop, in order. The program illustrated in FIG. 23 is a program in which the loop length of the inner loop is not a fixed value and is dependent on a value of the loop variable of the outer loop. This vectorization device acquires a maximum value that can be taken by the loop length of the inner loop dependent on the loop variable of the outer loop, and replaces the loop length of the inner loop with the maximum value. Then, this vectorization device vectorizes dual-loop processing in which the loop length of the inner loop is converted into a fixed value.

CITATION LIST

Patent Literature

[PTL 1] Japanese Laid-open Patent Publication No. 2001-043209
[PTL 2] Japanese Patent No. 3657414
[PTL 3] Japanese Laid-open Patent Publication No. 1992 (H04)-097484

SUMMARY OF INVENTION

Technical Problem

One program being difficult to vectorize is a program for performing an aggregate arithmetic operation in multi-loop processing. One example of such a program for performing an aggregate arithmetic operation is illustrated in FIG. 24. A one-dimensional array variable X for which a value is calculated by dual-loop processing illustrated in FIG. 24 does not contain a loop variable j (j is an integer equal to or more than 0) of an inner loop as an index value, and only contains a loop variable i (i is an integer equal to or more than 0) of an outer loop as an index value. The dual-loop processing illustrated in FIG. 24 is an arithmetic operation for calculating a sum of two-dimensional array variables Y as an array variable X by repetitively executing processing of the inner loop when the variable i is a certain value. An arithmetic operation in which a result of performing an arithmetic operation with respect to a plurality of elements included in an array variable Y (a second array variable) serves as one element of an array variable X (a first array variable different from the second array variable) as above is referred to as an "aggregate arithmetic operation" in the present application. It is generally difficult to vectorize a program for performing such an aggregate arithmetic operation by multi-loop processing, and PTLs 1 to 3 do not disclose any technique that can solve this problem. A main object of the invention of the present application is to provide a vectorization device solving this problem.

Solution to Problem

A vectorization device according to one aspect of the invention of the present application includes: a detection means capable of detecting, with respect to dual-loop processing included in software, a configuration in which a loop length of an inner loop is a variable value dependent on a value of a loop variable of an outer loop, and in which a first array variable representing a result of the dual-loop processing does not contain a loop variable of the inner loop as an index value; a fixed value determination means for, when the detection means detects the configuration, determining a fixed value based on predetermined criteria as the loop length of the inner loop; an expansion means for expanding an array size of a second array variable used for calculation of a value of the first array variable, and thereby enabling the dual-loop processing to process the inner loop the loop length of which is the fixed value; an expansion element setting means for setting an element value to an element of the second array variable newly added by the expansion means, and thereby equalizing results of the dual-loop processing before and after processing by the fixed value determination means and the expansion means is performed; and an update means for updating the software, based on processing results by the fixed value determination means, the expansion means, and the expansion element setting means.

In another perspective of accomplishing the above object, a vectorization method according to one aspect of the invention of the present application includes: being able to detect, with respect to dual-loop processing included in software, a configuration in which a loop length of an inner loop is a variable value dependent on a value of a loop variable of an outer loop, and in which a first array variable representing a result of the dual-loop processing does not contain a loop variable of the inner loop as an index value; when the configuration is detected, determining a fixed value based on predetermined criteria as the loop length of the inner loop; expanding an array size of a second array variable used for calculation of a value of the first array variable, and thereby enabling the dual-loop processing to process the inner loop the loop length of which is the fixed value; setting an element value to an element of the second array variable newly added by expansion of the array size, and thereby equalizing results of the dual-loop processing before and after determination of the fixed value and expansion of the array size are performed; and updating the software, based on processing results regarding determination of the fixed value, expansion of the array size, and setting of the element value to an element of the second array variable newly added by expansion of the array size.

In still another perspective of accomplishing the above object, a vectorization program according to one aspect of the invention of the present application causes a computer to execute: detection processing capable of detecting, with respect to dual-loop processing included in software, a configuration in which a loop length of an inner loop is a variable value dependent on a value of a loop variable of an outer loop, and in which a first array variable representing a result of the dual-loop processing does not contain a loop variable of the inner loop as an index value; fixed value determination processing of, when the detection processing detects the configuration, determining a fixed value based on predetermined criteria as the loop length of the inner loop; expansion processing of expanding an array size of a second array variable used for calculation of a value of the first array variable, and thereby enabling the dual-loop processing to process the inner loop the loop length of which is the fixed value; expansion element setting processing of setting an element value to an element of the second array variable newly added by the expansion processing, and thereby equalizing results of the dual-loop processing before and after processing by the fixed value determination processing and the expansion processing is performed; and update processing of updating the software, based on processing results by the fixed value determination processing, the expansion processing, and the expansion element setting processing.

Furthermore, the invention of the present application may also be realized by a computer-readable non-volatile recording medium on which the vectorization program (computer program) is stored.

Advantageous Effects of Invention

The invention of the present application enables vectorization of multi-loop processing including an arithmetic operation (aggregate arithmetic operation) in which a result of performing an arithmetic operation with respect to a plurality of elements included in a second array variable serves as one element of a first array variable different from the second array variable.

BRIEF DESCRIPTION OF DRAWINGS

FIG. 2 is a diagram illustrating an example (source program 201) of a source program 200 according to the first example embodiment of the invention of the present application.

FIG. 3 is a diagram exemplifying a configuration of an array in the source program 201 according to the first example embodiment of the invention of the present application.

FIG. 4 is a diagram exemplifying a configuration of an array in the source program 201 in which an array size is expanded by an expansion unit 13 according to the first example embodiment of the invention of the present application.

FIG. 5 is a diagram illustrating a vectorized source program 211 generated from the source program 201 by the vectorization device 10 according to the first example embodiment of the invention of the present application.

FIG. 6 is a diagram illustrating a vectorized source program 212 in which a dual loop of the vectorized source program 211 according to the first example embodiment of the invention of the present application is converted into a single loop.

FIG. 7 is a diagram illustrating a first example (source program 203) of the source program 200 according to a first modification example of the first example embodiment of the invention of the present application.

FIG. 8 is a diagram illustrating a second example (source program 204) of the source program 200 according to the first modification example of the first example embodiment of the invention of the present application.

FIG. 9 is a diagram illustrating a general configuration of a dual loop for performing an aggregate arithmetic operation.

FIG. 10 is a diagram illustrating a vectorized source program 213 generated from the source program 203 by the vectorization device 10 according to the first modification example of the first example embodiment of the invention of the present application.

FIG. 11 is a diagram illustrating a vectorized source program 214 generated from the source program 204 by the vectorization device 10 according to the first modification example of the first example embodiment of the invention of the present application.

FIG. 12 is a diagram illustrating a vectorized source program 215 in which an inner loop and an outer loop of the vectorized source program 213 according to the first modification example of the first example embodiment of the invention of the present application are switched.

FIG. 13 is a diagram illustrating a vectorized source program 216 in which an inner loop and an outer loop of the vectorized source program 214 according to the first modification example of the first example embodiment of the invention of the present application are switched.

FIG. 16 is a diagram exemplifying a vectorized source program 217 generated from the source program 207 by the vectorization device 10 according to the second modification example of the first example embodiment of the invention of the present application.

FIG. 17 is a diagram illustrating a configuration of an array in the vectorized source program 217 according to the second modification example of the first example embodiment of the invention of the present application.

FIG. 23 is a diagram illustrating an example of a general program representing a dual loop in which a loop length of an inner loop is dependent on a value of a loop variable of an outer loop.

FIG. 24 is a diagram illustrating an example of a general program for performing an aggregate arithmetic operation in a dual loop.

DESCRIPTION OF EMBODIMENTS

Hereinafter, example embodiments of the invention of the present application will be described in detail with reference to the drawings.

First Example Embodiment

Figure 1:
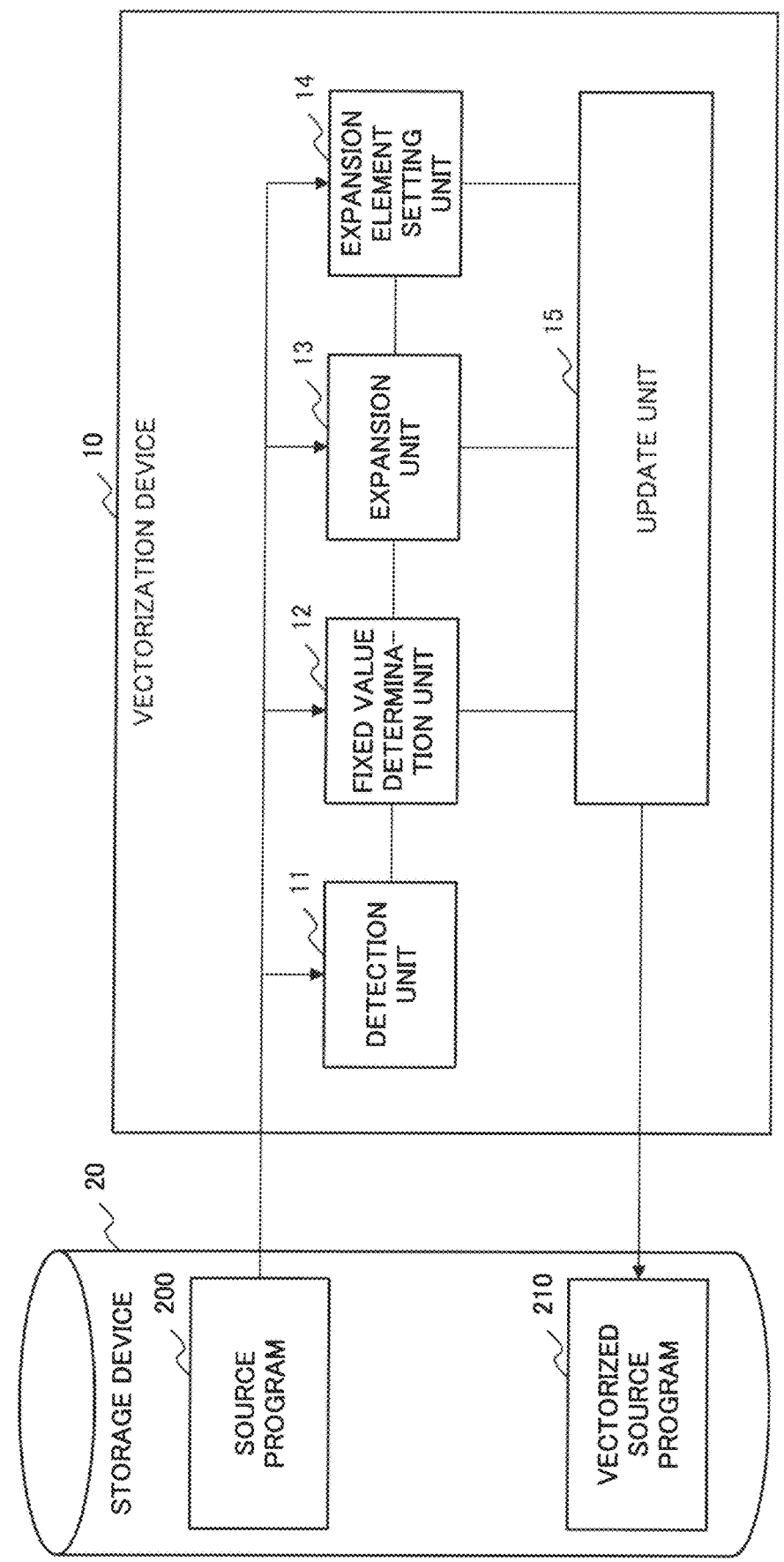
FIG. 1 is a block diagram illustrating a configuration of a vectorization device 10 according to a first example embodiment of the invention of the present application.

FIG. 1 is a block diagram conceptually illustrating a vectorization device 10 according to a first example embodiment of the invention of the present application. The vectorization device 10 is a device which vectorizes a source program 200 stored on a storage device 20, and stores a result of the vectorization on the storage device 20 as a vectorized source program 210. There is a case where the storage device 20 is incorporated in the vectorization device 10. The vectorization device 10 according to the present example embodiment includes the following configuration:

a detection unit 11;
a fixed value determination unit 12;
an expansion unit 13;
an expansion element setting unit 14; and
an update unit 15.

There is a case where the detection unit 11, the fixed value determination unit 12, the expansion unit 13, the expansion element setting unit 14, and the update unit 15 are electronic circuits, or are realized by a computer program and a processor operating in accordance with the computer program.

FIG. 2 illustrates a source program 201 as an example of the source program 200 which is a target for vectorization in the present example embodiment. As illustrated in FIG. 2, arrays X, Y, and Z are two-dimensional arrays (array variables), and an array NJ is a one-dimensional array. An array size of a first dimension of the arrays X, Y, and Z, and an array size of the array NJ are NI. An array size of a second dimension of X[i], Y[i], and Z[i] which are i-th (i is an integer equal to or more than 0) one-dimensional arrays regarding the arrays X, Y, and Z is equal to NJ[i] which is an i-th value of the array NJ. "*" in FIG. 2 represents a multiplication (the same also applies to the following drawings).

The detection unit 11 illustrated in FIG. 1 analyzes a configuration of the source program 200, thereby detecting that a configuration of dual-loop processing included in the source program 200 is a configuration satisfying the following three conditions. The dual-loop processing is iteration processing configured by an inner loop, and an outer loop enclosing the inner loop. In the present example embodiment, it is assumed that an analysis performed by the detection unit 11 uses an existing technique such as parsing based on, for example, information defining a syntax of a program.

A loop length of an inner loop in dual-loop processing is a variable value dependent on a value of a loop variable of an outer loop.

An array size of an array in dual-loop processing is equal to a loop length of a dual loop.

A substitution destination of an arithmetic result in dual-loop processing is an array, except for a temporary variable declared in the dual-loop processing.

The source program 201 satisfies the aforementioned first condition because a loop length of its inner loop is NJ[i] and dependent on a value of a loop variable i of an outer loop. As indicated by an indicator "# pragma array_size" in the source program 201 illustrated in FIG. 2, the array size of the arrays X, Y, and Z is equal to a loop length of the dual-loop processing, and the source program 201 therefore satisfies the aforementioned second condition. Because a substitution destination of an arithmetic result in dual-loop processing of the source program 201 is an array X[i][j] (j is an integer equal to or more than 0), the source program 201 satisfies the aforementioned third condition. The detection unit 11 notifies the fixed value determination unit 12 of this detection result.

When the detection unit 11 detects that the source program 200 satisfies the aforementioned three conditions, the fixed value determination unit 12 illustrated in FIG. 1 determines a fixed value (hereinafter referred to as "LLEN") based on predetermined criteria as the loop length of the inner loop in the dual-loop processing included in the source program 200. The fixed value determination unit 12 determines the LLEN as, for example, "a maximum value of an array representing the loop length of the inner loop in the dual-loop processing". Alternatively, the fixed value determination unit 12 determines the LLEN as "a maximum integer N satisfying (sum of arrays representing loop length of inner loop)÷(loop length of outer loop)×N≥predetermined value (e.g. 0.9)". In other words, in this case, the fixed value determination unit 12 determines, as the LLEN, a maximum value of a particular integer value satisfying that a ratio of a sum of loop lengths of the inner loop to a value obtained by multiplying the loop length of the outer loop by the particular integer value is equal to or more than a predetermined value. Alternatively, the fixed value determination unit 12 determines the LLEN in accordance with a directive described in the source program 200 by a user.

FIG. 3 exemplifies a configuration of an array used by the source program 201. Dark squares in FIG. 3 represent elements of the arrays X, Y, and Z. It is assumed that predetermined values are individually set to these elements. Herein, it is assumed that the fixed value determination unit 12 determines the LLEN as "a maximum value of an array representing the loop length of the inner loop in the dual-loop processing". In an example illustrated in FIG. 3, a maximum value of the array NJ representing the loop length of the inner loop in the dual-loop processing included in the source program 201 is 4. Therefore, the fixed value determination unit 12 determines the LLEN as 4. The fixed value determination unit 12 notifies the expansion unit 13 and the update unit 15 of the determined value of the LLEN.

The expansion unit 13 illustrated in FIG. 1 expands an array size of an array used by dual-loop processing included in the source program 200, in such a way that the dual-loop processing can process an inner loop the loop length of which is the LLEN.

FIG. 4 illustrates an example in which the expansion unit 13 expands an array size with respect to an array used by the source program 201 illustrated in FIG. 2. A square drawn with a dotted line in FIG. 4 indicates an element added by expansion processing performed by the expansion unit 13. As illustrated in FIGS. 3 and 4, the expansion unit 13 expands an array size to NI×LLEN in a state where all elements before the expansion processing is performed are included, with respect to the arrays X, Y, and Z. The expansion unit 13 notifies the expansion element setting unit 14 and the update unit 15 of contents of performing the expansion processing regarding the array used by the dual-loop processing included in the source program 200.

The expansion element setting unit 14 illustrated in FIG. 1 sets a value (element value) to the element of the array newly added by the expansion unit 13, in such a way that results of the dual-loop processing included in the source program 200 are equal before and after processing by the fixed value determination unit 12 and the expansion unit 13 is performed. With regard to the source program 201, the element of the array newly added by the expansion unit 13 is an element which is not used as a result of the dual-loop processing. Therefore, in this case, the expansion element setting unit 14 may set any element value to the newly added element of the array. The expansion element setting unit 14 notifies the update unit 15 of contents of the element value set to the newly added element of the array.

The update unit 15 illustrated in FIG. 1 updates the source program 200 on the base of contents of the processing performed by the fixed value determination unit 12, the expansion unit 13, and the expansion element setting unit 14. FIG. 5 illustrates a vectorized source program 211 which the update unit 15 has generated by updating the source program 201. As illustrated in FIG. 5, the loop length of the inner loop in the dual-loop processing is updated by the update unit 15 from "NJ[i]" illustrated in FIG. 2 to "4" determined as the LLEN by the fixed value determination unit 12. The update unit 15 stores the generated vectorized source program 211 on the storage device 20 as the vectorized source program 210.

The update unit 15 may further perform vector optimization processing on the vectorized source program 211. In the vectorized source program 211, the loop length of the inner loop in the dual-loop processing is "4". When "NI" which is the loop length of the outer loop in this dual-loop processing is a value sufficiently greater than "4", performing a vector arithmetic operation by the outer loop improves efficiency of an arithmetic operation. Therefore, the update unit 15 generates a vectorized source program 212 in which the dual-loop processing in the vectorized source program 211 is converted into single-loop processing, as illustrated in FIG. 6. The update unit 15 stores the generated vectorized source program 212 on the storage device 20 as the vectorized source program 210.

In the present example embodiment described above, because the fixed value determination unit 12 sets the LLEN to "a maximum value of an array representing the loop length of the inner loop in the dual-loop processing", an array having an array size greater than the LLEN does not exist among the arrays used by the dual-loop processing. However, when the fixed value determination unit 12 determines the LLEN by criteria different from the above, there is a case where an array having an array size greater than the LLEN exists among the arrays used by the dual-loop processing. In this case, the update unit 15 generates a dual loop for performing processing with respect to an array having an array size greater than the LLEN.

First Modification Example of First Example Embodiment

Next, a first modification example of the present example embodiment is described in detail. The configuration of the vectorization device 10 according to the first modification example of the present example embodiment is as described above with reference to FIG. 1.

In the present modification example, the detection unit 11 analyzes the source program 200, thereby detecting that a configuration of dual-loop processing included in the source program 200 is a configuration satisfying the following two conditions.

A loop length of an inner loop in dual-loop processing is a variable value dependent on a value of a loop variable of an outer loop.

A first array representing a result of dual-loop processing is an aggregate arithmetic operation which does not contain a loop variable of an inner loop as an index value.

FIG. 7 illustrates a source program 203 as a first example of the source program 200 according to the present modification example. As illustrated in FIG. 7, an array X and an array NJ are one-dimensional arrays, and an array Y is a two-dimensional array. The source program 203 is an aggregate arithmetic operation for calculating a sum of squares of a two-dimensional array Y[i][j] by repetitively executing processing of the inner loop as an array X[i] when a variable i is a certain value.

FIG. 9(a) illustrates a general configuration of a dual loop representing an aggregate arithmetic operation for calculating a sum of array arithmetic operations. In the aggregate arithmetic operation illustrated in FIG. 9(a), a sum obtained by repetitively executing the inner loop with respect to an arithmetic result by an arithmetic operation f regarding two-dimensional arrays In0, In1, and the like is calculated as a one-dimensional array Out.

FIG. 8 illustrates a source program 204 as a second example of the source program 200 according to the present modification example. The source program 204 is an aggregate arithmetic operation for calculating a product of a two-dimensional array Y[i][j] as an array X[i] by repetitively executing processing of the inner loop when a variable i is a certain value.

FIG. 9(b) illustrates a general configuration of a dual loop representing an aggregate arithmetic operation for calculating a product of array arithmetic operations. In the aggregate arithmetic operation illustrated in FIG. 9(b), a product obtained by repetitively executing the inner loop with respect to an arithmetic result by an arithmetic operation f regarding two-dimensional arrays In0, In1, and the like is calculated as a one-dimensional array Out.

The source programs 203 (FIG. 7) and 204 (FIG. 8) satisfy these two conditions. The detection unit 11 notifies the fixed value determination unit 12 of this determination result.

When the detection unit 11 detects that the source program 200 satisfies the aforementioned two conditions, the fixed value determination unit 12 determines the LLEN by the aforementioned procedure, as the loop length of the inner loop in the dual-loop processing included in the source program 200. When a configuration of an array used by the source program 203 or 204 is, for example, as illustrated in FIG. 3, the fixed value determination unit 12 determines the LLEN as "4" as described above. When a configuration of an array used by the source program 203 or 204 is different from the example illustrated in FIG. 3, the fixed value determination unit 12 determines the LLEN as, for example, a different value which is not "4".

The expansion unit 13 expands an array size of an array used by the dual-loop processing included in the source program 200, in such a way that the dual-loop processing can process an inner loop the loop length of which is the LLEN.

The expansion element setting unit 14 sets an element value to the element of the array newly added by the expansion unit 13, in such a way that results of the dual-loop processing included in the source program 200 are equal before and after processing by the fixed value determination unit 12 and the expansion unit 13 is performed. Because the source program 203 or 204 is a program for performing an aggregate arithmetic operation, the expansion element setting unit 14 needs to set a suitable value to the newly added element of the array, in contrast to the case of the source program 201. Accordingly, in the following explanation, a method whereby the expansion element setting unit 14 sets a suitable value to a newly added element of an array is described in detail.

The expansion element setting unit 14 sets a value to a temporary variable (hereinafter, referred to as "PRVAL") according to an aggregate arithmetic operation performed by a dual loop. For example, when an aggregate arithmetic operation performed by a dual loop is an arithmetic operation for calculating a sum like the source program 203, the expansion element setting unit 14 sets 0 to the PRVAL. For example, when an aggregate arithmetic operation performed by a dual loop is an arithmetic operation for calculating a product like the source program 204, the expansion element setting unit 14 sets 1 to the PRVAL.

The expansion element setting unit 14 sets a value to the element of the array newly added by the expansion unit 13, in such a way that a value of f (In0, In1, . . . ) is equal to the PRVAL in the configuration illustrated in FIG. 9. More specifically, the expansion element setting unit 14 sets "0" to the element of the array newly added by the expansion unit 13, with respect to the source program 203. The expansion element setting unit 14 sets "1" to the element of the array newly added by the expansion unit 13, with respect to the source program 204.

FIG. 10 illustrates a vectorized source program 213 which the update unit 15 has generated by updating the source program 203. FIG. 11 illustrates a vectorized source program 214 which the update unit 15 has generated by updating the source program 204. As illustrated in FIGS. 10 and 11, the loop length of the inner loop in the dual-loop processing is updated by the update unit 15 from "NJ[i]" illustrated in FIGS. 7 and 8 to the LLEN.

The update unit 15 may further perform vector optimization processing on the vectorized source programs 213 and 214. When NI which is the loop length of the outer loop in the dual-loop processing included in the source programs 213 and 214 is a value sufficiently greater than the LLEN, switching the inner loop and the outer loop improves efficiency of an arithmetic operation. More specifically, as illustrated in FIG. 12, the update unit 15 generates a vectorized source program 215 generated by switching the inner loop and the outer loop with respect to the dual-loop processing in the vectorized source program 213 illustrated in FIG. 10. As illustrated in FIG. 13, the update unit 15 generates a vectorized source program 216 generated by switching the inner loop and the outer loop with respect to the dual-loop processing in the vectorized source program 214 illustrated in FIG. 11.

Figure 18:
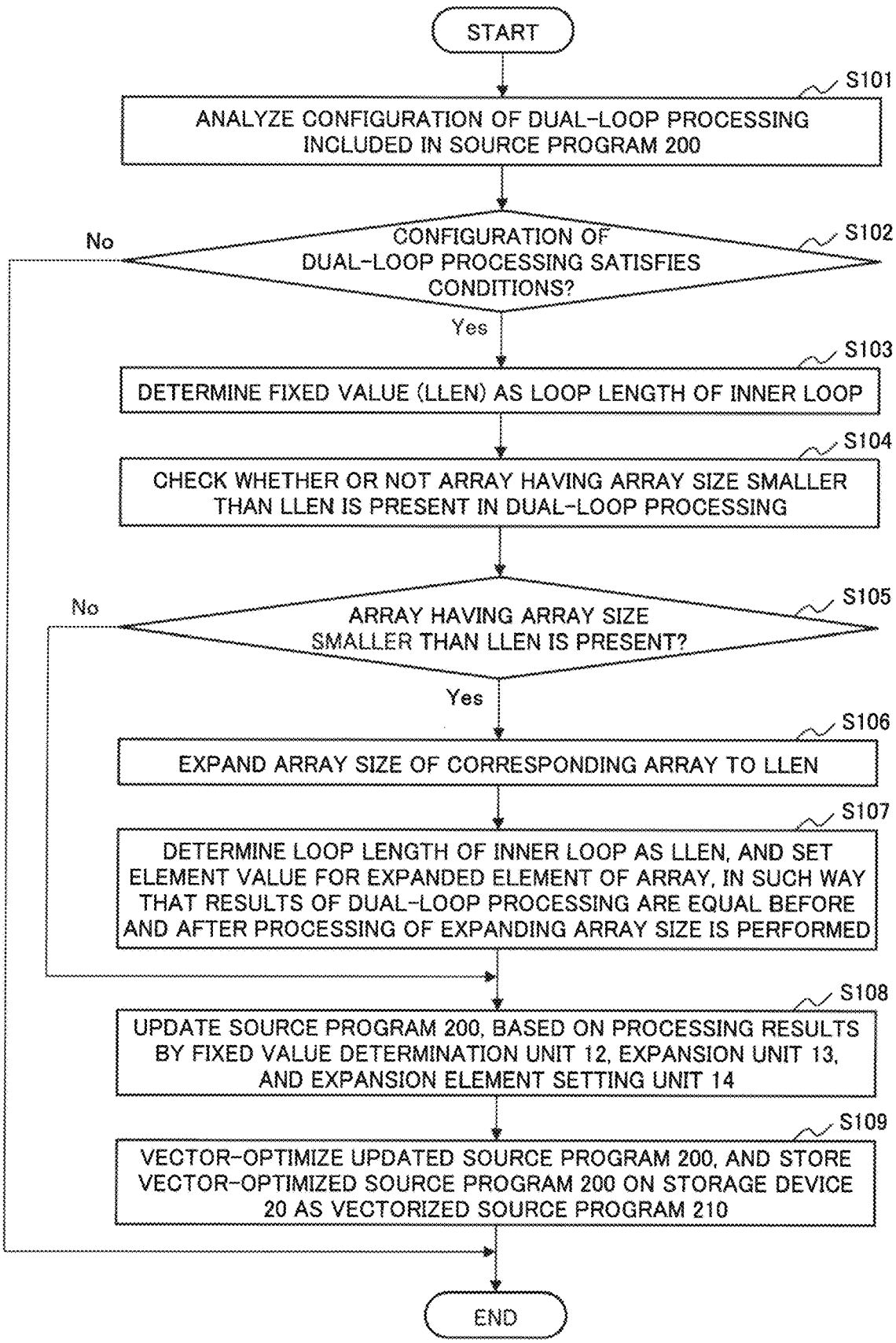
FIG. 18 is a flowchart illustrating an operation of the vectorization device 10 according to the first example embodiment and its first modification example of the invention of the present application.

Next, an operation (processing) of the vectorization device 10 according to the present example embodiment (including the first modification example) is described in detail with reference to a flowchart in FIG. 18.

The detection unit 11 analyzes a configuration of dual-loop processing included in the source program 200 (step S101). When the configuration of the dual-loop processing does not satisfy predetermined conditions (the aforementioned three or two conditions) (No in step S102), the overall processing ends. When the configuration of the dual-loop processing satisfies the predetermined conditions (Yes in step S102), the fixed value determination unit 12 determines a fixed value (LLEN) as a loop length of an inner loop (step S103).

The expansion unit 13 checks whether or not an array having an array size smaller than the LLEN is present in the dual-loop processing (step S104). When an array having an array size smaller than the LLEN is not present (No in step S105), the processing proceeds to step S108. When an array having an array size smaller than the LLEN is present (Yes in step S105), the expansion unit 13 expands the array size of the corresponding array to the LLEN (step S106).

After the loop length of the inner loop is determined as the LLEN, the expansion element setting unit 14 sets an element value to the expanded element of the array, in such a way that results of the dual-loop processing are equal before and after processing of expanding the array size is performed (step S107). The update unit 15 updates the source program 200 on the base of the processing results by the fixed value determination unit 12, the expansion unit 13, and the expansion element setting unit 14 (step S108). The update unit 15 vector-optimizes the updated source program 200, and stores the vector-optimized source program 200 on the storage device 20 as a vectorized source program 210 (step S109), and the overall processing ends.

The vectorization device 10 according to the present example embodiment is capable of vectorizing multi-loop processing including an arithmetic operation (aggregate arithmetic operation) in which a result of performing an arithmetic operation with respect to a plurality of elements included in a second array variable serves as one element of a first array variable different from the second array variable. The reason is that the vectorization device 10 operates as follows:

the fixed value determination unit 12 determines a fixed value based on predetermined criteria as a loop length of an inner loop, with respect to a dual loop for performing an aggregate arithmetic operation included in the source program 200;

the expansion unit 13 expands an array size of an array used by dual-loop processing, in such a way that the dual-loop processing can process an inner loop the loop length of which is set as a fixed value; and the expansion element setting unit 14 sets an element value to the element of the array newly added by the expansion unit 13, in such a way that results of the dual-loop processing are equal before and after processing by the fixed value determination unit 12 and the expansion unit 13 is performed.

Hereinafter, advantageous effects realized by the vectorization device 10 according to the present example embodiment and its first modification example are described in detail.

It is difficult to vectorize software for performing an aggregate arithmetic operation (i.e., an arithmetic operation in which a result of performing an arithmetic operation with respect to a plurality of elements included in a second array variable serves as one element of a first array variable different from the second array variable) in multi-loop processing, due to its structural characteristic. Therefore, when a vector arithmetic operation unit performs such software, there is a problem that a vector arithmetic operation function of the vector arithmetic operation unit cannot be fully utilized.

On the contrary, in the vectorization device 10 according to the present example embodiment and its first modification example, when the detection unit 11 detects that a dual loop for performing an aggregate arithmetic operation is included in the source program 200, the fixed value determination unit 12 determines a fixed value based on predetermined criteria as a loop length of an inner loop. The expansion unit 13 expands an array size of a used array, in such a way that the dual-loop processing can process an inner loop the loop length of which is set as the fixed value by the fixed value determination unit 12. The expansion element setting unit 14 sets an element value to the element of the array newly added by the expansion unit 13. The element value set at this point is a value satisfying that an execution result of the source program 200 is not changed (i.e., is not affected) by performance of the processing by the fixed value determination unit 12 and the expansion unit 13. Then, the update unit 15 updates the software on the base of the processing results by the fixed value determination unit 12, the expansion unit 13, and the expansion element setting unit 14. Thereby, the vectorization device 10 according to the present example embodiment and its first modification example can vectorize multi-loop processing including an aggregate arithmetic operation.

Furthermore, the vectorization device 10 according to the present example embodiment and its first modification example suitably sets a value to the newly added element of the array, depending on whether an aggregate arithmetic operation included in multi-loop processing obtains a sum or a product of arithmetic results regarding one or more arrays. Thereby, the vectorization device 10 according to the present example embodiment and its first modification example can perform flexible processing dependent on contents of an aggregate arithmetic operation.

Moreover, in the vectorization device 10 according to the present example embodiment and its first modification example, the fixed value determination unit 12 determines a maximum value of a loop length of an inner loop, as a loop length of an inner loop. Alternatively, the fixed value determination unit 12 determines, as its fixed value, a maximum value of a particular integer value satisfying that a ratio of a sum of loop lengths of the inner loop to a value obtained by multiplying the loop length of an outer loop by the particular integer value is equal to or more than a predetermined value. In other words, the vectorization device 10 according to the present example embodiment and its first modification example can perform flexible processing when a loop length of an inner loop is converted into a fixed value.

Although the vectorization device 10 vectorizes dual-loop processing including an aggregate arithmetic operation in the example described in the above present example embodiment and its first modification example, the vectorization device 10 can vectorize triple or more multi-loop processing including an aggregate arithmetic operation as well. In this case, the vectorization device 10 needs only to sequentially perform the aforementioned processing of vectorizing the dual-loop processing for a plurality of layers.

Second Modification Example of First Example Embodiment

Next, a second modification example of the present example embodiment is described in detail. The configuration of the vectorization device 10 according to the second modification example of the present example embodiment is as described above with reference to FIG. 1.

Figure 14:
FIG. 14 is a diagram illustrating an example (source program 207) of the source program 200 according to a second modification example of the first example embodiment of the invention of the present application.

FIG. 14 illustrates a source program 207 as an example of the source program 200 according to the present modification example. As illustrated in FIG. 14, the source program 207 is a program including an aggregate arithmetic operation in which a part of the arithmetic operation f in the dual loop illustrated in FIG. 9(a) is replaced with an array the element of which is an index. As illustrated in FIG. 14, an array X, an array NJ, and an array A are one-dimensional arrays, and an array Y is a two-dimensional array.

Figure 15:
FIG. 15 is a diagram exemplifying a configuration of an array in the source program 207 according to the second modification example of the first example embodiment of the invention of the present application.

FIG. 15 illustrates a configuration of an array used by the source program 207. As illustrated in FIG. 15, a configuration of the array Y is similar to that of the array Y used by the source program 201 illustrated in FIG. 3. The number of elements of the array A is "NA" which is a value determined depending on a value that can be taken by the array Y.

FIG. 16 illustrates a vectorized source program 217 which the vectorization device 10 has generated by vectorizing the source program 207. FIG. 17 illustrates a configuration of an array used by the vectorized source program 217.

The detection unit 11 and the fixed value determination unit 12 operate as described in the first modification example of the first example embodiment.

The expansion unit 13 expands an array size as described above, with respect to the array Y, as illustrated in FIG. 17. The expansion unit 13 adds A[NA] which is a (NA+1)-th element, with respect to the array A.

The expansion element setting unit 14 sets an element value to the element of the array newly added by the expansion unit 13, in such a way that results of the dual-loop processing included in the source program 200 are equal before and after processing by the fixed value determination unit 12 and the expansion unit 13 is performed. In this case, the expansion element setting unit 14 sets "NA" to the element of the array Y newly added by the expansion unit 13. The expansion element setting unit 14 sets "0" to A[NA] newly added by the expansion unit 13.

The update unit 15 generates a vectorized source program 217 generated by switching the inner loop and the outer loop after updating the loop length of the inner loop in the dual-loop processing to the LLEN, with respect to the source program 207, as illustrated in FIG. 16.

The vectorization device 10 according to the present second modification example is capable of vectorizing multi-loop processing including an arithmetic operation (aggregate arithmetic operation) in which a result of performing an arithmetic operation with respect to a plurality of elements included in a second array variable serves as one element of a first array variable different from the second array variable. The reason is that the vectorization device 10 operates as follows:

the fixed value determination unit 12 determines a fixed value based on predetermined criteria as a loop length of an inner loop, with respect to a dual loop for performing an aggregate arithmetic operation included in the source program 200;

the expansion unit 13 expands an array size of an array used by dual-loop processing, in such a way that the dual-loop processing can process an inner loop the loop length of which is set as a fixed value; and the expansion element setting unit 14 sets an element value to the element of the array newly added by the expansion unit 13, in such a way that results of the dual-loop processing are equal before and after processing by the fixed value determination unit 12 and the expansion unit 13 is performed.

Even when an aggregate arithmetic operation included in multi-loop processing is an arithmetic operation including an array the element of which is an index, the vectorization device 10 according to the present second modification example suitably expands an array size of a used array, and suitably sets a value to the newly added element of the array. Thereby, the vectorization device 10 according to the present second modification example can perform more flexible processing dependent on contents of an aggregate arithmetic operation.

Second Example Embodiment

Figure 19:
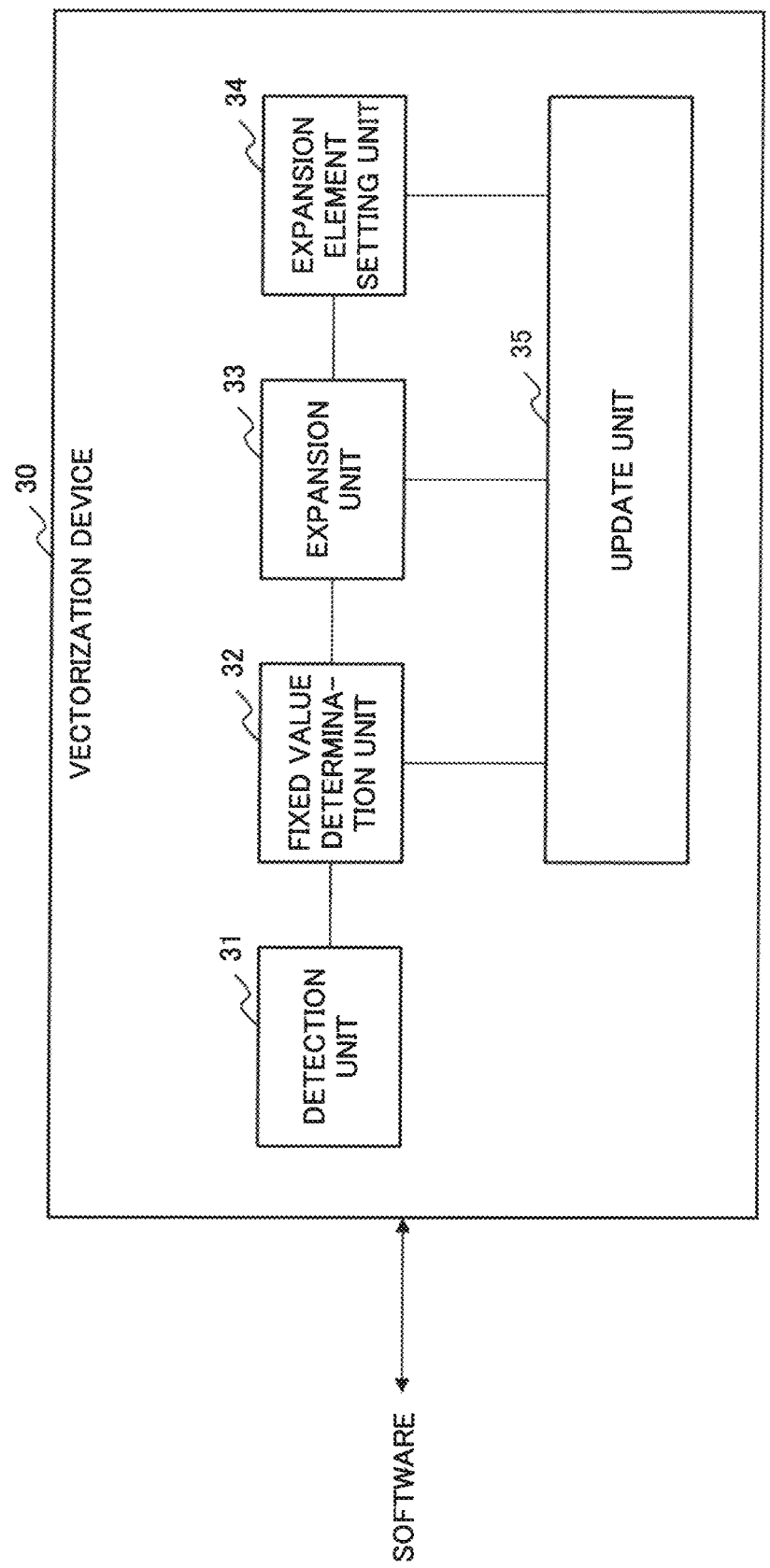
FIG. 19 is a block diagram illustrating a configuration of a vectorization device 30 according to a second example embodiment of the invention of the present application.

FIG. 19 is a block diagram conceptually illustrating a configuration of a vectorization device 30 according to a second example embodiment.

The vectorization device 30 according to the present example embodiment includes a detection unit 31, a fixed value determination unit 32, an expansion unit 33, an expansion element setting unit 34, and an update unit 35.

The detection unit 31 is capable of detecting, with respect to dual-loop processing included in software, a configuration in which a loop length of an inner loop is a variable value dependent on a value of a loop variable of an outer loop, and in which a first array variable representing a result of the dual-loop processing does not contain the loop variable of the inner loop as an index value.

The fixed value determination unit 32 determines a fixed value based on predetermined criteria as the loop length of the inner loop, when the detection unit 31 detects the aforementioned configuration.

The expansion unit 33 expands an array size of a second array variable used for a calculation of a value of a first array variable. Thereby, the expansion unit 33 enables the dual-loop processing to process the inner loop the loop length of which is the fixed value determined by the fixed value determination unit 32.

The expansion element setting unit 34 sets an element value to an element of the second array variable newly added by the expansion unit 33. Thereby, the expansion element setting unit 34 equalizes results of the dual-loop processing before and after processing by the fixed value determination unit 32 and the expansion unit 33 is performed.

The update unit 35 updates the software on the base of processing results by the fixed value determination unit 32, the expansion unit 33, and the expansion element setting unit 34.

The vectorization device 30 according to the present example embodiment is capable of vectorizing multi-loop processing including an arithmetic operation (aggregate arithmetic operation) in which a result of performing an arithmetic operation with respect to a plurality of elements included in a second array variable serves as one element of a first array variable different from the second array variable. The reason is that the vectorization device 30 operates as follows:

the fixed value determination unit 32 determines a fixed value based on predetermined criteria as a loop length of an inner loop, with respect to a dual loop for performing an aggregate arithmetic operation included in software;

the expansion unit 33 expands an array size of an array used by dual-loop processing, in such a way that the dual-loop processing can process an inner loop the loop length of which is set as a fixed value; and the expansion element setting unit 34 sets an element value to the element of the array newly added by the expansion unit 33, in such a way that results of the dual-loop processing are equal before and after processing by the fixed value determination unit 32 and the expansion unit 33 is performed.

Hardware Configuration Example

Each unit illustrated in FIGS. 1 and 19 in each of the example embodiments described above can be realized by exclusive hardware (HW) (electronic circuit). Moreover, in FIGS. 1 and 19, at least the following configurations can be considered as functional (processing) units (software modules) of a software program:
the detection units 11 and 31;
the fixed value determination units 12 and 32;
the expansion units 13 and 33;
the expansion element setting units 14 and 34; and
the update units 15 and 35.

However, classification of each unit illustrated in these drawings is a configuration for convenience of explanation, and various configurations can be assumed at a time of mounting. One example of a hardware environment in this case is described with reference to FIG. 20.

Figure 20:
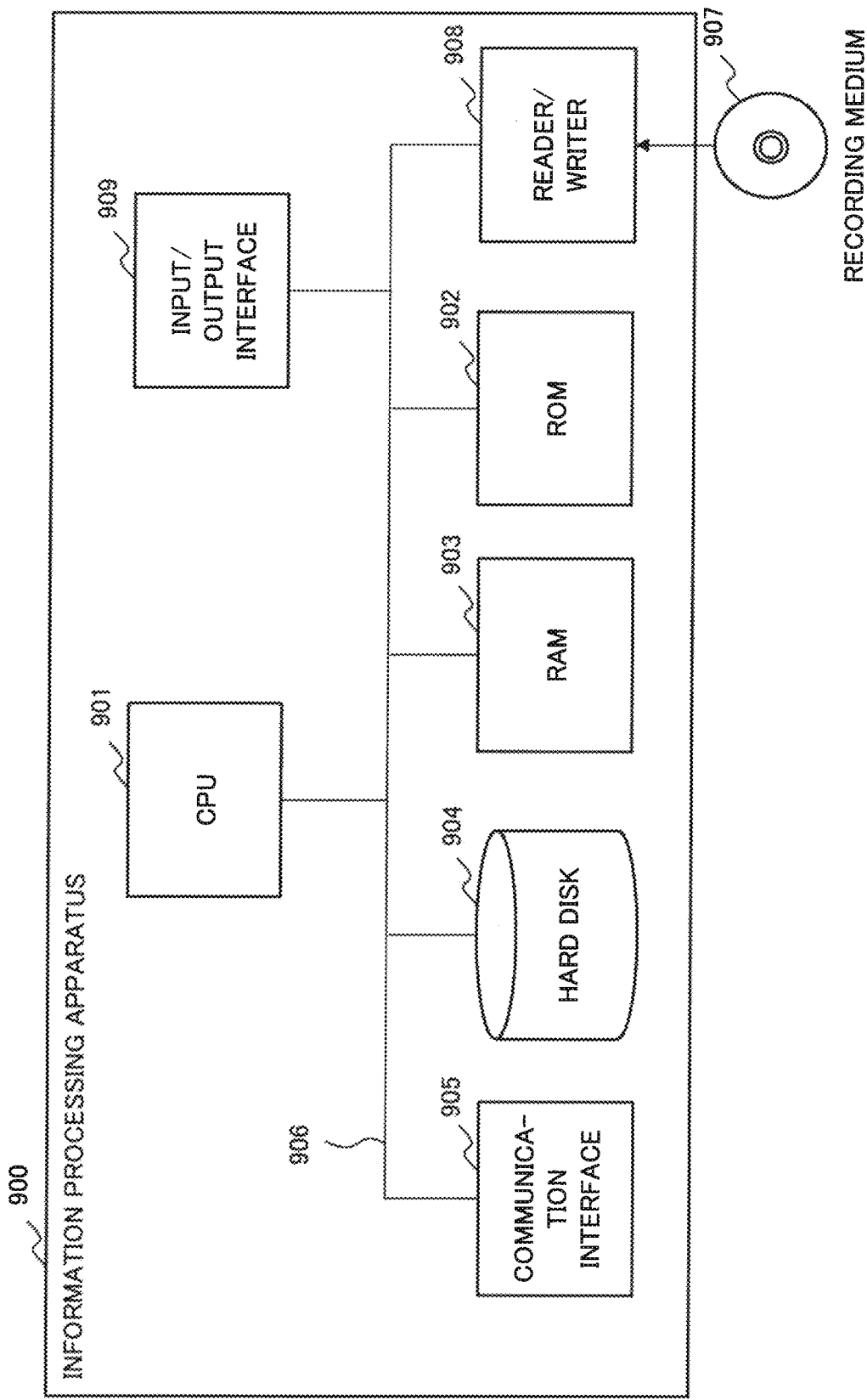
FIG. 20 is a block diagram exemplifying a configuration of an information processing apparatus capable of executing the vectorization device according to each example embodiment of the invention of the present application.
Figure 21:
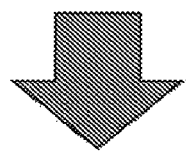
FIG. 21 is a diagram illustrating a general example of performing vectorization by switching an inner loop and an outer loop in dual-loop processing.
Figure 22:
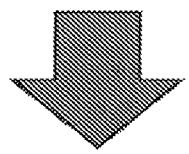
FIG. 22 is a diagram illustrating a general example of performing vectorization by converting dual-loop processing into a single loop.

FIG. 20 is a diagram exemplarily illustrating a configuration of an information processing apparatus 900 (computer) capable of executing the vectorization device according to each example embodiment of the invention of the present application. In other words, FIG. 20 illustrates a configuration of a computer (information processing apparatus) capable of realizing the vectorization devices illustrated in FIGS. 1 and 19, and a hardware environment that can realize each function in the example embodiments described above.

The information processing apparatus 900 illustrated in FIG. 20 includes the followings as components:
a central processing unit (CPU) 901;
a read only memory (ROM) 902;
a random access memory (RAM) 903;
a hard disk (storage device) 904;
a communication interface 905 with an external device;
a bus 906 (communication line);
a reader/writer 908 capable of reading and writing data stored on a recording medium 907 such as a compact disc read only memory (CD-ROM); and
an input/output interface 909.

In other words, the information processing apparatus 900 including the components described above is a general computer in which these configurations are connected via the bus 906. While there is a case where the information processing apparatus 900 includes a plurality of CPUs 901, there is also a case where the information processing apparatus 900 includes a multicore CPU 901.

Furthermore, the invention of the present application described with the above example embodiments by way of example provides a computer program capable of realizing the following functions for the information processing apparatus 900 illustrated in FIG. 20. The functions are the configurations described above in the block configuration diagrams (FIGS. 1 and 19) referred to in the description of the example embodiments of these functions, or the functions in the flowchart (FIG. 18). Then, the invention of the present application is accomplished by reading the computer program onto the CPU 901 of the hardware, and interpreting and executing the computer program. In addition, the computer program provided in the apparatus needs only to be stored on a non-volatile storage device such as a readable and writable volatile memory (RAM 903) or the hard disk 904.

Moreover, in the case described above, a general procedure can be adopted at present for a method of providing the computer program in the hardware. The procedure includes, for example, a method which installs the computer program in the apparatus via various recording media 907 such as a CD-ROM, a method which externally downloads the computer program via a communication line such as the Internet, and the like. Then, in such a case, the invention of the present application can be considered as being configured by a code constituting the computer program, or the recording medium 907 on which the code is stored.

The invention of the present application has been described so far with the above example embodiments by way of model example. However, the invention of the present application is not limited to the example embodiments described above. In other words, various aspects that can be understood by a person skilled in the art are applicable to the invention of the present application within the scope of the invention of the present application.

This application is based upon and claims the benefit of priority from Japanese patent application No. 2015-227256, filed on Nov. 20, 2015, the disclosure of which is incorporated herein in its entirety by reference.

REFERENCE SIGNS LIST

10 Vectorization device
11 Detection unit
12 Fixed value determination unit
13 Expansion unit
14 Expansion element setting unit
15 Update unit
20 Storage device
200 Source program
201 Source program
203 Source program
204 Source program
207 Source program
210 Vectorized source program
211 Vectorized source program
212 Vectorized source program
213 Vectorized source program
214 Vectorized source program
215 Vectorized source program
216 Vectorized source program
217 Vectorized source program
30 Vectorization device
31 Detection unit
32 Fixed value determination unit
33 Expansion unit
34 Expansion element setting unit
35 Update unit
900 Information processing apparatus
901 CPU
902 ROM
903 RAM
904 Hard disk (storage device)
905 Communication interface
906 Bus
907 Recording medium
908 Reader/writer
909 Input/output interface

What is claimed is:

1. A vectorization device comprising:
a memory that stores a set of instructions, and
at least one processor configured to execute the set of instructions to:
detect, with respect to dual-loop processing included in software, a configuration in which a loop length of an inner loop is a variable value dependent on a value of a loop variable of an outer loop, and in which a first array variable representing a result of the dual-loop processing does not contain a loop variable of the inner loop as an index value;
detecting the configuration, determine a fixed value based on predetermined criteria as the loop length of the inner loop;
expand an array size of a second array variable used for calculation of a value of the first array variable, and thereby enable the dual-loop processing to process the inner loop the loop length of which is the fixed value;
set an element value to an element of the second array variable newly added, and thereby equal results of the dual-loop processing before and after determination of the fixed value and expansion of the array size are performed; and
update the software, based on processing results regarding determination of the fixed value, expansion of the array size, and setting of the element value to an element value of the second array variable newly added by expansion of the array size.

2. The vectorization device according to claim 1, wherein the at least one processor is further configured to execute the set of instructions to
set the element value to the element of the second array variable newly added, in such a way that an arithmetic result regarding the second array variable is 0, when the dual-loop processing acquires a sum of arithmetic results regarding one or more of the second array variables by iteration processing using the inner loop at every time of the outer loop.

3. The vectorization device according to claim 1, wherein the at least one processor is further configured to execute the set of instructions to
set the element value to the element of the second array variable newly added, so that an arithmetic result regarding the second array variable is 1, when the dual-loop processing acquires a product of arithmetic results regarding one or more of the second array variables by iteration processing using the inner loop at every time of the outer loop.

4. The vectorization device according to claim 2, wherein the at least one processor is further configured to execute the set of instructions to
set 0 as the element value of the second array variable newly added by the expansion unit, when a sum of one of the second array variable is acquired by iteration processing using the inner loop at every time of the outer loop.

5. The vectorization device according to claim 3, wherein set 1 as the element value of the second array variable newly added, when a product of one of the second array variable is acquired by iteration processing using the inner loop at every time of the outer loop.

6. The vectorization device according to claim 1, wherein the at least one processor is further configured to execute the set of instructions to:
expand, when a third array variable containing the second array variable as an index value is used for calculation of a value of the first array variable, an array size of the third array variable,
set an index value indicating one of elements of the third array variable newly added by the expansion unit, to an element of the second array variable newly added; and
set the element value to an element of the third array variable newly added in such a way that results of the dual-loop processing are equal before and after expansion of the array size is performed.

7. The vectorization device according to claim 1, wherein the at least one processor is further configured to execute the set of instructions to
determine, as the fixed value, a maximum value of a loop length of the inner loop differing in value depending on the outer loop.

8. The vectorization device according to claim 1, wherein the at least one processor is further configured to execute the set of instructions to
determine, as the fixed value, a maximum value of a particular integer value satisfying that a ratio of a sum of loop lengths of the inner loop to a value acquired by multiplying a loop length of the outer loop by the particular integer value is equal to or more than a predetermined value.

9. A vectorization method comprising:
by an information processing apparatus,
detecting, with respect to dual-loop processing included in software, a configuration in which a loop length of an inner loop is a variable value dependent on a value of a loop variable of an outer loop, and in which a first array variable representing a result of the dual-loop processing does not contain a loop variable of the inner loop as an index value;
when the configuration is detected, determining a fixed value based on predetermined criteria as the loop length of the inner loop;
expanding an array size of a second array variable used for calculation of a value of the first array variable, and thereby enabling the dual-loop processing to process the inner loop the loop length of which is the fixed value;
setting an element value to an element of the second array variable newly added by expansion of the array size, and thereby equalizing results of the dual-loop processing before and after determination of the fixed value and expansion of the array size are performed; and
updating the software, based on processing results regarding determination of the fixed value, expansion of the array size, and setting of the element value to an element of the second array variable newly added by expansion of the array size.

10. A non-transitory computer readable recording medium on which a vectorization program is stored, the vectorization program causing a computer to execute:
detection processing of detecting, with respect to dual-loop processing included in software, a configuration in which a loop length of an inner loop is a variable value dependent on a value of a loop variable of an outer loop, and in which a first array variable representing a result of the dual-loop processing does not contain a loop variable of the inner loop as an index value;
fixed value determination processing of, when the detection processing detects the configuration, determining a fixed value based on predetermined criteria as the loop length of the inner loop;

expansion processing of expanding an array size of a second array variable used for calculation of a value of the first array variable, and thereby enabling the dual-loop processing to process the inner loop the loop length of which is the fixed value;

expansion element setting processing of setting an element value to an element of the second array variable newly added by the expansion processing, and thereby equalizing results of the dual-loop processing before and after processing by the fixed value determination processing and the expansion processing is performed; and update processing of updating the software, based on processing results by the fixed value determination processing, the expansion processing, and the expansion element setting processing.

\* \* \* \* \*